(12) United States Patent
Ohashi (10) Patent No.: US 11,330,083 B2
(45) Date of Patent: May 10, 2022

(54) TRANSFORMATION DEVICE, TRANSFORMATION METHOD AND STORAGE MEDIUM

(71) Applicant: TOYOTA JIDOSHA KABUSHIKI KAISHA, Toyota (JP)

(72) Inventor: Kosuke Ohashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 20 days.

(21) Appl. No.: 17/039,198

(22) Filed: Sep. 30, 2020

(65) Prior Publication Data

US 2021/0112147 A1 Apr. 15, 2021

(30) Foreign Application Priority Data

Oct. 10, 2019 (JP) .............................. JP2019-186846

(51) Int. Cl.
*H04L 69/08* (2022.01)
*H04L 69/18* (2022.01)
*H04L 67/565* (2022.01)

(52) U.S. Cl.
CPC .......... *H04L 69/08* (2013.01); *H04L 67/2823* (2013.01); *H04L 69/18* (2013.01)

(58) Field of Classification Search
CPC .......... H04L 69/08; H04L 69/18; H04L 67/12
See application file for complete search history.

(56) References Cited

U.S. PATENT DOCUMENTS

| 9,229,963 | B2 * | 1/2016 | DeSanzo | G06F 16/211 |
| 2013/0297630 | A1 * | 11/2013 | DeSanzo | H04L 67/12 |
| | | | | 707/756 |

| 2016/0197783 | A1 * | 7/2016 | Hort | H04L 41/0809 |
| | | | | 709/222 |
| 2017/0147812 | A1 * | 5/2017 | Ujiie | H04L 63/20 |
| 2018/0262466 | A1 * | 9/2018 | Atad | H04L 67/12 |
| 2018/0352040 | A1 | 12/2018 | Bartsch et al. | |
| 2018/0365423 | A1 * | 12/2018 | Poppe | G05B 19/0426 |

(Continued)

FOREIGN PATENT DOCUMENTS

| DE | 102018218927 A1 * | 5/2020 | .......... H04L 67/2828 |
| JP | 2018-207489 A | 12/2018 | |
| WO | WO-2020094346 A1 * | 5/2020 | ............. H04L 12/40 |

OTHER PUBLICATIONS

English translation from Google Patents of DE102018218927A1 (Year: 2018).*

*Primary Examiner* — James E Springer
*Assistant Examiner* — Patrick F Ngankam
(74) *Attorney, Agent, or Firm* — Oliff PLC (57) ABSTRACT

A transformation device installed in a vehicle includes a transformation section, a transmission section, a detection section and a control section. The transformation section transforms data transmitted from a first control device in a first communication protocol to data in a second communication protocol. The transmission section transmits the data transformed by the transformation section to a second control device. The detection section detects an update of one or more of the first control device and the second control device. In a case in which an update of at least one of the first control device or the second control device is detected by the detection section, the control section changes a mode of transformation by the transformation section.

9 Claims, 10 Drawing Sheets

(56) References Cited

U.S. PATENT DOCUMENTS

2019/0128551 A1* 5/2019 Herai .................. F24F 11/58
2019/0132424 A1   5/2019 Jeong et al.
2020/0342099 A1* 10/2020 Kerstein .............. G07C 5/008

* cited by examiner

TRANSFORMATION DEVICE, TRANSFORMATION METHOD AND STORAGE MEDIUM

CROSS-REFERENCE TO RELATED APPLICATION

This application is based on and claims priority under 35 USC 119 from Japanese Patent Application No. 2019-186846 filed on Oct. 10, 2019, the disclosure of which is incorporated by reference herein.

BACKGROUND

Technical Field

The present disclosure relates to a transformation device, a transformation method, and a storage medium.

Related Art

Japanese Patent Application Laid-Open (JP-A) No. 2018-207489 includes descriptions about SOME/IP (Scalable Service-Oriented MiddlewarE over IP).

Because of development trends in vehicles (over-the-air (OTA) updates, autonomous driving and so forth), electronic platforms of future vehicles will require service protocol communications instead of conventional signal protocol communications. However, switching from one communication protocol to another at once is difficult in respect of diversion of components and so forth. In addition, for small-scale data communication requiring real time performance, such as sending and receiving sensor data and the like, a signal protocol communication is more suitable than a service protocol communication that has greater overhead. Therefore, it is necessary to provide service communications and signal communications together.

Figure 9:
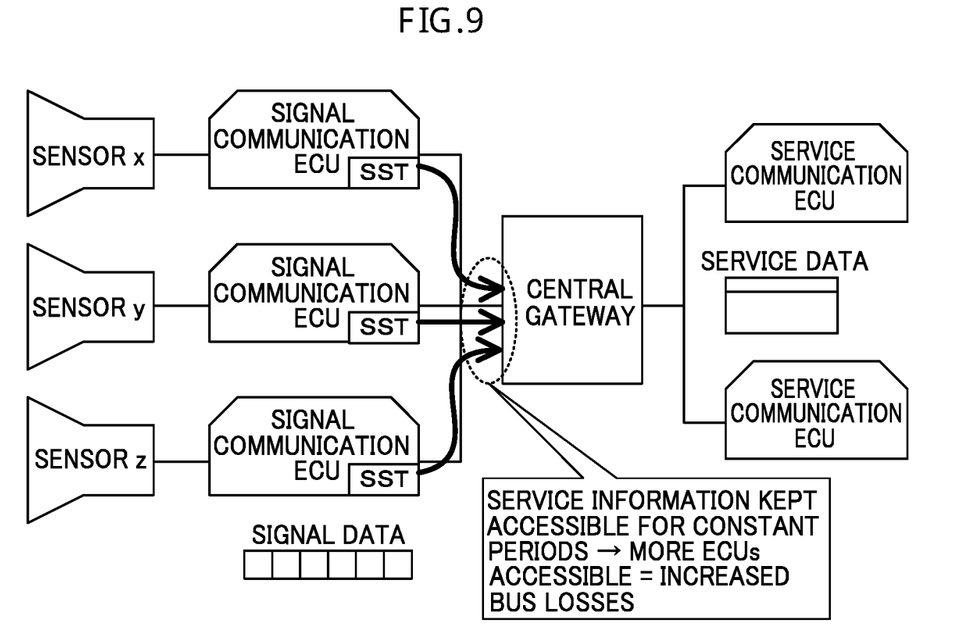
FIG. 9 is a schematic block diagram for describing a related art.

In SOME/IP, an electronic control unit (ECU) that performs signal protocol communications in a conventional manner is provided with functions for service protocol communications. Thus, both kinds of communication protocol may work together. When a signal communication protocol and a service communication protocol are provided together, Signal-Service Transformation (SST) is necessary for conversion between the two protocols. When SST functions are embedded in ECUs, for example, as illustrated in FIG. 9, each ECU keeps service information accessible for constant periods. Therefore, the greater the number of ECUs with embedded SST functions, the greater bus losses are.

Figure 10:
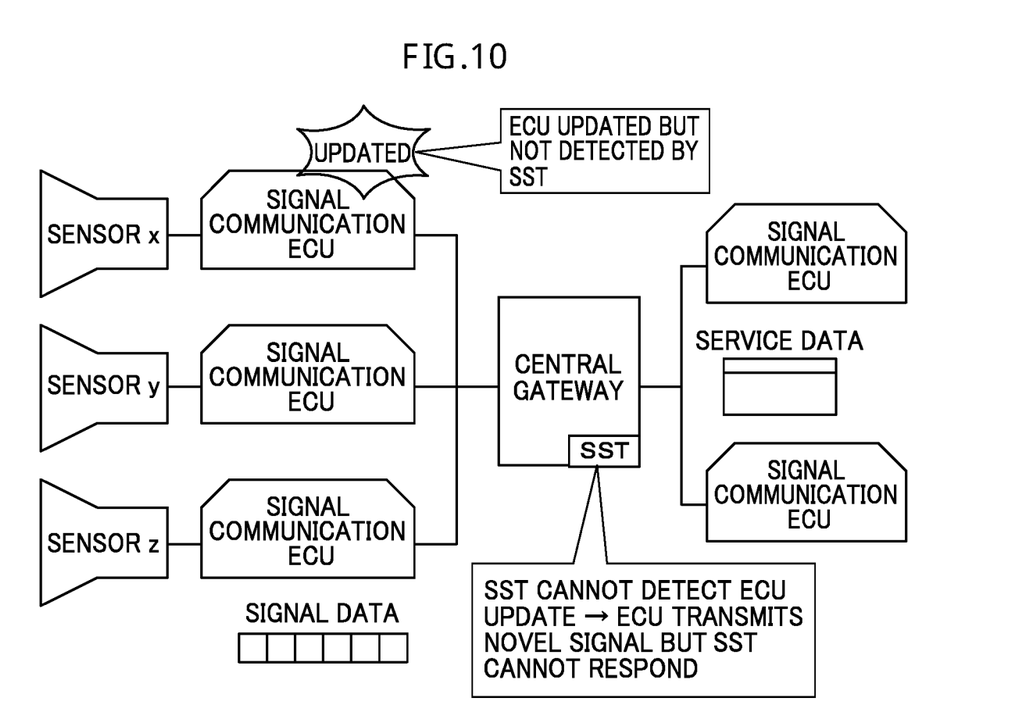
FIG. 10 is a schematic block diagram for describing a related art.

Accordingly, for example, as illustrated in FIG. 10, a possible technique is to embed SST functions in an ECU corresponding to a boundary between the service communication protocol and the signal communication protocol, such as an Ethernet® switch, a central gateway or the like, and having signal protocol communications and service protocol communications be transformed in batches. However, SST does not include functions to detect updates of control devices such as individual ECUs and the like included in an on-board network and to be updated itself. Therefore, when the functions of control devices are updated by OTA in this configuration, the SST needs to be separately updated manually.

SUMMARY

The present disclosure is made in consideration of the circumstances described above, and provides a transformation device, transformation method and storage medium that, in a case in which a control device is updated, may make unnecessary a manual update of a transformation mode from data in a first communication protocol to data in a second communication protocol.

A first aspect of the present disclosure is a transformation device that is installed in a vehicle and includes: a transformation section that transforms data transmitted from a first control device in a first communication protocol to data in a second communication protocol; a transmission section that transmits the data transformed by the transformation section to a second control device; a detection section that detects an update of at least one of the first control device or the second control device; and a control section that, in a case in which an update of at least one of the first control device or the second control device is detected by the detection section, changes a mode of the transformation by the transformation section.

In the first aspect, in a case in which the detection section detects that at least one of the first control device or the second device is updated, the mode of transformation by the transformation section that transforms data in the first communication protocol to data in the second communication protocol is changed. Therefore, in a case in which a control device is updated, manually updating the transformation mode from data in the first communication protocol to data in the second communication protocol may be made unnecessary.

In the first aspect, the transformation section may refer to a transformation map to perform the transformation, the transformation map defining data transformation rules, and the control section changes the mode of the transformation by updating the transformation map.

In the configuration described above, the change of the mode of transformation by the transformation section is implemented by updating the transformation map that sets data transformation rules. Therefore, the change in the mode of transformation may be realized by simpler processing than in a case in which a program that causes a device to function as the transformation section is updated or the like.

In the first aspect, one of the first communication protocol or the second communication protocol may be a signal communication protocol, and the other may be a service communication protocol.

According to the configuration described above, because transformations are performed between data in a signal communication protocol and data in a service communication protocol, signal protocol communications and service protocol communications may be provided together.

In the first aspect, the control section may: in a case in which a novel signal from a control device that performs signal communications is detected by the detection section, checks whether the novel signal is similar to previous signals; in a case in which the novel signal is similar to the previous signals, checks that the novel signal is not an erroneous signal; subsequently, checks that none of the previous signals is being propagated through a network; in a case in which none of the previous signals is being propagated through the network, confirms a user as to whether the control device that performs signal communications has been updated; and in a case in which the control device that performs signal communications has been updated, changes the mode of the transformation.

In the configuration described above, the mode of transformation by the transformation section is changed after it is confirmed by the detection section that a detected novel signal is not abnormal data. Therefore, a case of the mode of transformation by the transformation section being erroneously changed when abnormal data is erroneously detected as a novel signal may be avoided.

In the first aspect, the control section may: in a case in which a novel service request from a control device that performs service communications is detected by the detection section, analyzes the detected service request and checks whether a signal requested by the detected service request is available; and in a case in which the signal is available, changes the mode of the transformation.

In the configuration described above, the mode of transformation by the transformation section is changed after it is confirmed by the detection section that a signal requested by the detected service request is present. Therefore, a case of the mode of transformation by the transformation section being erroneously changed when a signal requested by a detected service request is not available may be avoided.

A second aspect of the present disclosure is an operation method of a transformation device installed in a vehicle, the operation method including: transforming data transmitted from a first control device in a first communication protocol to data in a second communication protocol; transmitting the transformed data to a second control device; detecting an update of at least one of the first control device or the second control device; and in a case in which an update of at least one of the first control device or the second control device is detected, changing a mode of the transforming.

A third aspect of the present disclosure is a non-transitory computer readable storage medium storing a program that causes an on-vehicle computer to execute transformation processing, the transformation processing including: transforming data transmitted from a first control device in a first communication protocol to data in a second communication protocol; transmitting the transformed data to a second control device; detecting an update of at least one of the first control device or the second control device; and in a case in which an update of at least one of the first control device or the second control device is detected, changing a mode of the transforming.

According to the above aspects, in a case in which a control device is updated, a manual update of the transformation mode from data in the first communication protocol to data in the second communication protocol may be unnecessary.

DETAILED DESCRIPTION

Figure 1:
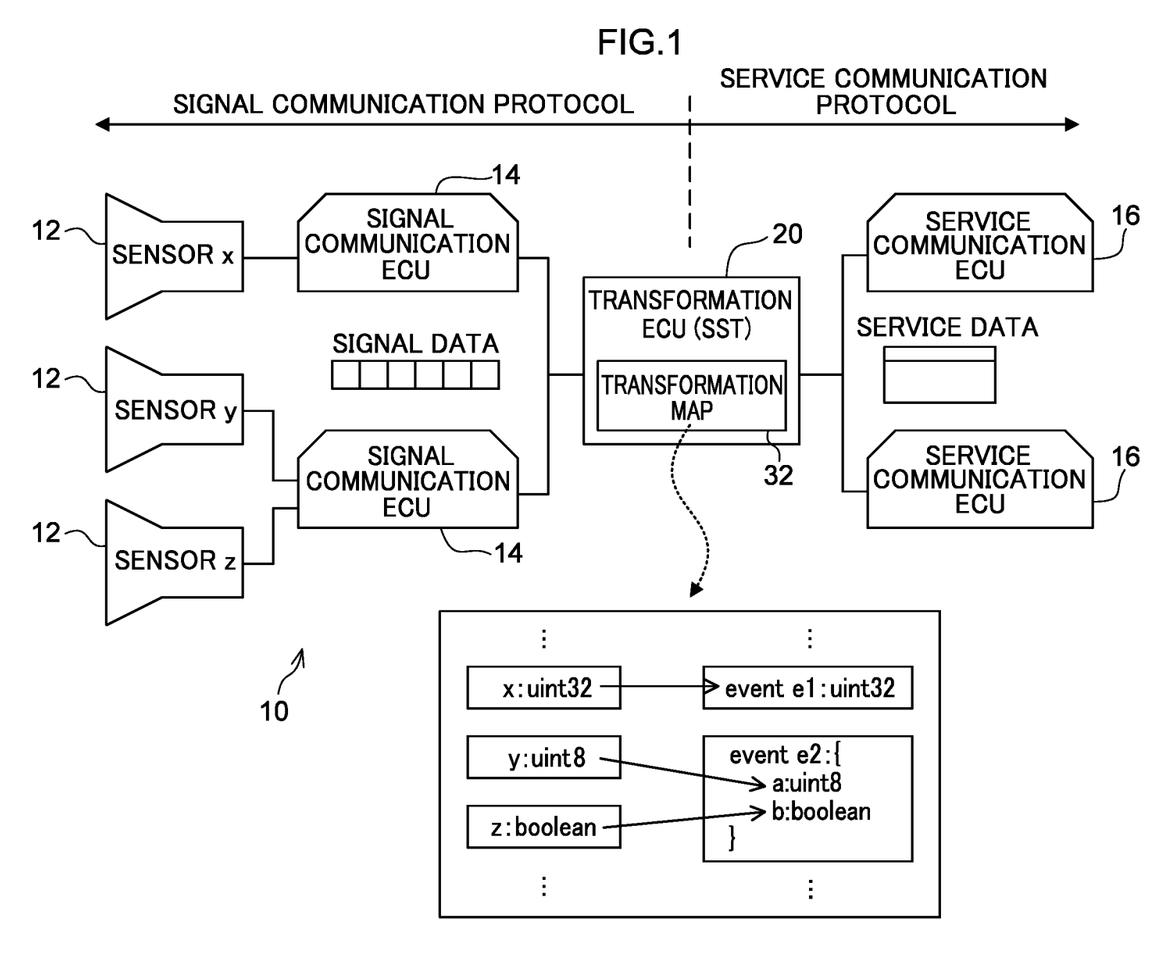
FIG. 1 is a block diagram illustrating a schematic configuration of an on-board network according to an exemplary embodiment.

Herebelow, an exemplary embodiment of the present disclosure is described in detail with reference to the attached drawings. As illustrated in FIG. 1, an on-board network 10 according to the exemplary embodiment includes plural sensors 12, plural signal communication ECUs (sensor controllers) 14, and plural service communication ECUs 16. The signal communication ECUs 14 are each connected to one or more of the sensors 12 and perform signal protocol communications. The service communication ECUs 16 perform service protocol communications. A transformation ECU 20 is provided between the signal communication ECUs 14 and the service communication ECUs 16. The transformation ECU 20 functions as an example of an SST unit equipped with functions relating to the present disclosure.

Herein, signal protocol communications is a communications system that is possible to send/receive only a single set of data in a single cycle of communications, and service protocol communications is a communications system that is able to aggregate and send/receive plural kinds of data in a single cycle of communications. FIG. 1 depicts only parts of the on-board network 10; numbers of the signal communication ECUs 14, the service communication ECUs 16 and the sensors 12 are not limited by the example illustrated in FIG. 1.

Figure 2:
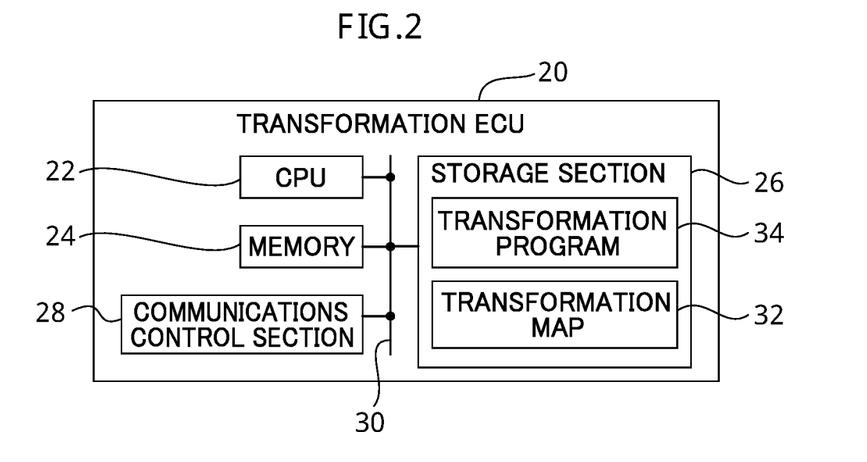
FIG. 2 is a block diagram illustrating a schematic configuration of a transformation ECU.

As illustrating in FIG. 2, the transformation ECU 20 includes a central processing unit (CPU) 22, a memory 24 such as read-only memory (ROM) and random access memory (RAM) or the like, a non-volatile storage section 26 such as a hard disk drive (HDD), solid state drive (SSD) or the like, and a communications control section 28. The CPU 22, memory 24, storage section 26 and communications control section 28 are connected to be capable of communicating with one another via an internal bus 30.

A transformation map 32 and a transformation program 34 are stored in the storage section 26. The transformation map 32 defines transformation rules (communication definitions) between data in the signal communication protocol and data in the service communication protocol, and may be updated dynamically. An example of (a portion of) the transformation map 32 is illustrated in FIG. 1. The transformation ECU 20 reads the transformation program 34 from the storage section 26 and loads the transformation program 34 into the memory 24. The transformation ECU 20 functions as a transformation section 36, a transmission section 38, a detection section 40 and a control section 42 illustrated in FIG. 3 as a result that the transformation program 34 loaded into the memory 24 being executed by the CPU 22.

Figure 3:
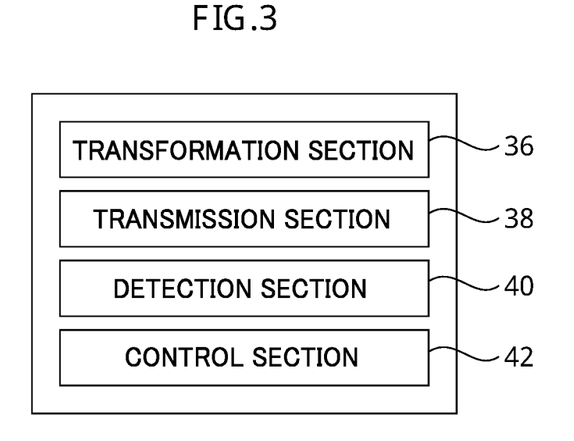
FIG. 3 is a functional block diagram of the transformation ECU.

On the basis of the transformation rules defined in the transformation map 32, the transformation section 36 transforms data transmitted from the signal communication ECUs 14 in the signal communication protocol to data in the service communication protocol, and transforms data transmitted from the service communication ECUs 16 in the service communication protocol to data in the signal communication protocol. The transmission section 38 transmits the data in the service communication protocol transformed by the transformation section 36 to the service communication ECUs 16, and transmits the data in the signal communication protocol transformed by the transformation section 36 to the signal communication ECUs 14.

The detection section 40 detects an update of one or more of the signal communication ECUs 14 and service communication ECUs 16. In a case in which an update of at least one of the signal communication ECUs 14 or the service communication ECUs 16 is detected by the detection section 40, the control section 42 changes a mode of transformation by the transformation section 36, by updating the transformation map 32.

Figure 4:
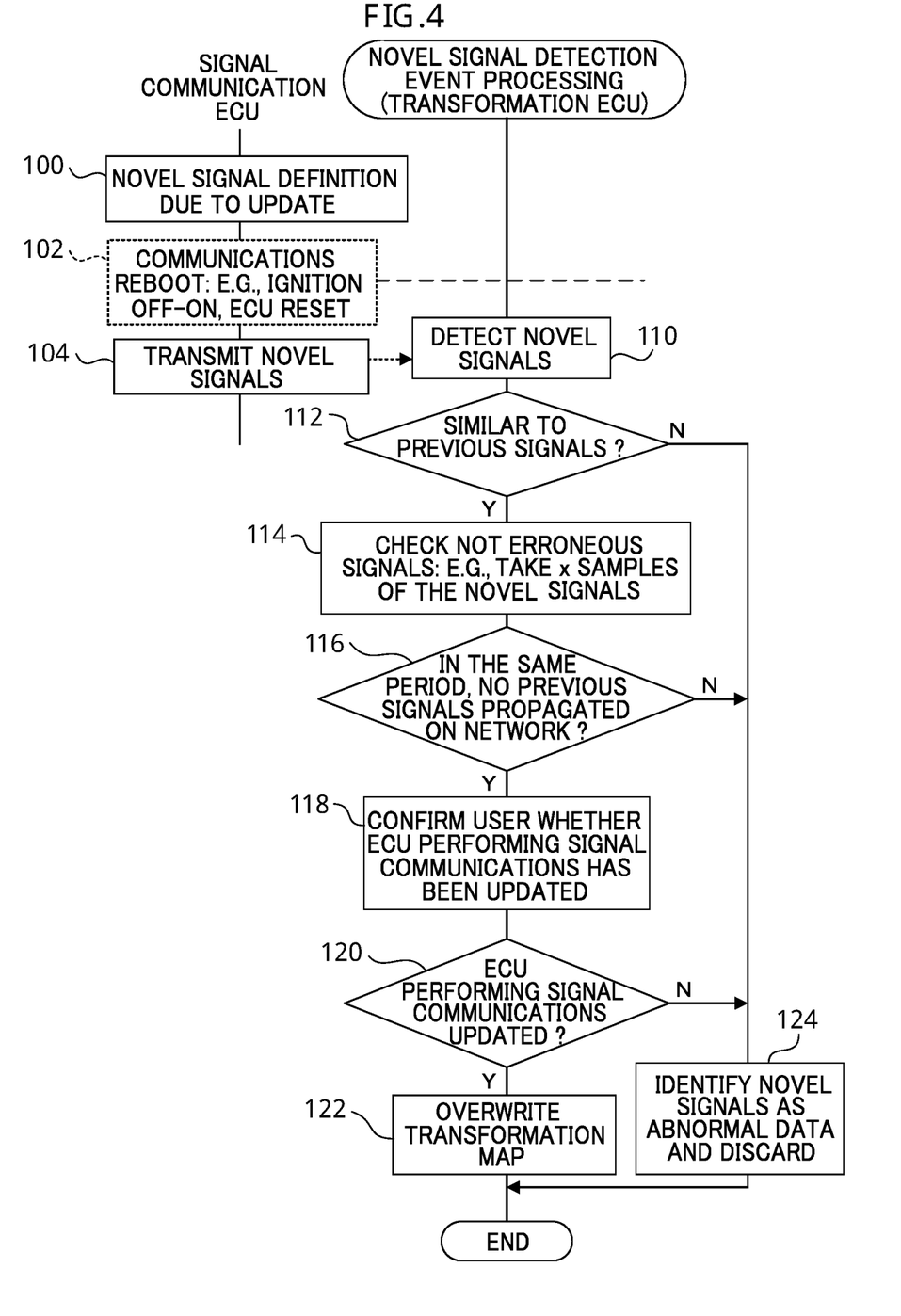
FIG. 4 is a flowchart illustrating novel signal detection event processing that is executed by the transformation ECU in a case in which novel signals are detected.

Now, operation of the exemplary embodiment in a case in which an update is carried out at the signal communication ECUs 14 side is described with reference to FIG. 4.

In step 100, one of the signal communication ECUs 14 carries out an update in accordance with a command from a user in association with, for example, replacement of one of the connected sensors 12 or the like, and the signal communication ECU 14 defines novel signals to be transmitted after the update. In the exemplary embodiment, these novel signals transmitted by the signal communication ECU 14 after the update contain an ID the same as in previous signals transmitted by the signal communication ECU 14 before the update.

In step 102, the signal communication ECU 14 is rebooted by, for example, an ignition switch being switched from off to on and an ECU reset being performed. In step 104, the signal communication ECU 14 at which the update has been carried out transmits the novel signals.

After the transformation ECU 20 receives the novel signals transmitted from the signal communication ECU 14, the transformation ECU 20 executes novel signal detection event processing. That is, in step 110, the detection section 40 detects the reception of novel signals, by detecting that the received signals are not defined in the transformation map 32. On the basis of the ID contained in the signals whose reception is detected, the transformation ECU 20 identifies previous signals that correspond with the novel signals.

Then, in step 112, the control section 42 makes a determination as to whether the detected novel signals are similar to the corresponding previous signals. As a specific example, if sensor data contained in the conventional previous signals and the novel signals is vehicle speed data, values of vehicle speed represented by the vehicle speed data change continuously rather than exhibiting dispersed values in a time series. Accordingly, the control section 42 has learned change trends of the vehicle speeds represented by vehicle speed data from the previous signals, and the control section 42 makes the determination as to whether the novel signals are similar to the corresponding previous signals by making a determination as to whether values represented by the sensor data contained in the corresponding novel signals exhibit similar change trends.

In a case in which it is determined that the novel signals and the corresponding previous signals are not similar, the result of the determination in step 112 is negative and the control section 42 proceeds to step 124. In step 124, the control section 42 determines that the most recently detected novel signals are abnormal data, discards the novel signals, and ends the novel signal detection event processing.

On the other hand, in a case in which it is determined that the novel signals and the corresponding previous signals are similar, the result of the determination in step 112 is affirmative and the control section 42 proceeds to step 114. In step 114, the control section 42 checks that the novel signals are not erroneous signals by executing processing such as, for example, sampling the most recently detected novel signals x times or the like.

Then, in step 116, the control section 42 makes a determination as to whether there has been no propagation of the previous signals over the on-board network 10 while the control section 42 has been executing the processing to check that the novel signals are not erroneous signals. In a case in which the result of the determination in step 116 is negative, the control section 42 proceeds to step 124. In step 124, the control section 42 determines that the most recently detected novel signals are abnormal data, discards the novel signals, and ends the novel signal detection event processing.

Alternatively, in a case in which the determination is that the previous signals are not being propagated over the on-board network 10, the result of the determination in step 116 is affirmative and the control section 42 proceeds to step 118. In step 118, the control section 42 confirms a user whether or not an update of the signal communication ECU 14 has been carried out, for example, by displaying a message at a display section of a navigation device or the like.

In step 120, the control section 42 makes a determination as to whether a response that the signal communication ECU 14 has been updated is obtained from the user. In a case in which the result of the determination in step 120 is negative, the control section 42 proceeds to step 124. In step 124, the control section 42 determines that the most recently detected novel signals are abnormal data, discards the novel signals, and ends the novel signal detection event processing.

Alternatively, in a case in which a response that the signal communication ECU 14 has been updated is obtained from the user, the result of the determination in step 120 is affirmative and the control section 42 proceeds to step 122. In step 122, the control section 42 overwrites information about the previous signals recorded in the transformation map 32 with information about the most recently detected novel signals, and ends the novel signal detection event processing.

A specific example of carrying out an update at the signal communication ECUs 14 side is described with reference to FIG. 5.

Figure 5:
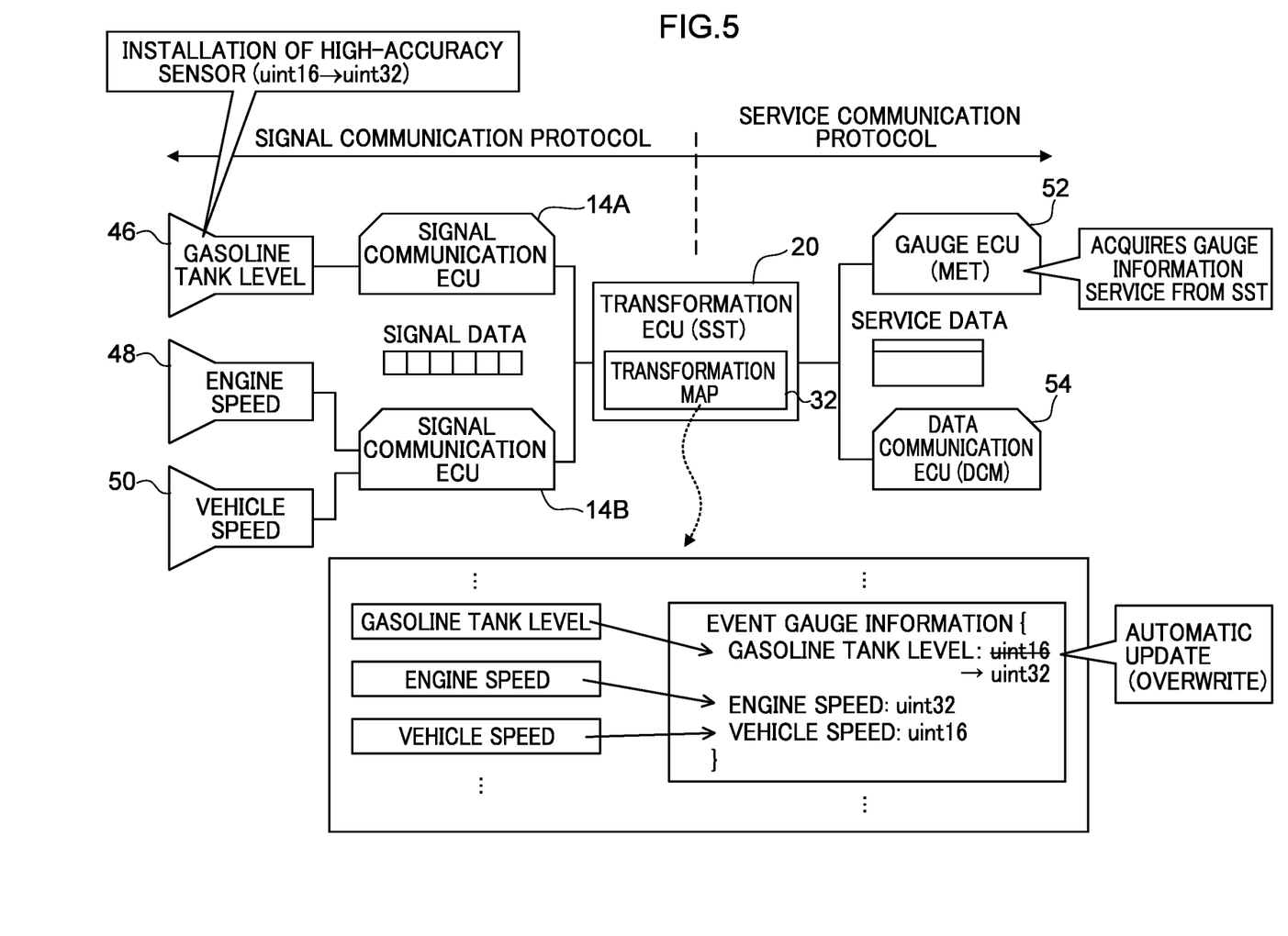
FIG. 5 is a schematic diagram for describing an example of operations in a case in which the novel signal detection event processing is executed.

In the example illustrated in FIG. 5, a gasoline tank level sensor 46, an engine speed sensor 48 and a vehicle speed sensor 50 that serve as the sensors 12 are provided. The gasoline tank level sensor 46 is connected to a signal communication ECU 14A, and the engine speed sensor 48 and vehicle speed sensor 50 are connected to a signal communication ECU 14B. A gauge ECU 52 and a data communication ECU 54 that serve as the service communication ECUs 16 are also provided. The transformation ECU 20 aggregates (transforms) respective data of gasoline tank levels, engine speeds and vehicle speeds received by signal communications to single sets of gauge information, and transmits the gauge information to the gauge ECU 52 in the service communication protocol.

In the example illustrated in FIG. 5, the gasoline tank level sensor 46 is replaced with a higher precision (higher resolution) sensor and an update of the signal communication ECU 14A is carried out at the same time. Accordingly, signal protocol signals are changed (from 16-bit signals to 32-bit signals). Conventionally, it would then be necessary to separately update the SST manually.

In the exemplary embodiment, by contrast, the transformation ECU 20 executes the novel signal detection event processing described above. Thus, the transformation map 32 is automatically overwritten as illustrated in FIG. 5 (changing "uint16" to "uint32"), and an update of the transformation ECU 20 is not required. As a result of the transformation map 32 being overwritten, 32-bit gasoline tank level data included in the novel signals may be transformed to gauge information by the transformation ECU 20 and transmitted to the gauge ECU 52.

With respect to the gauge ECU 52, because the gauge ECU 52 simply acquires a gauge information service from the transformation ECU 20, an update of the gauge ECU 52 is unnecessary. Therefore, a number of updates may be reduced to just one, the update of the signal communication ECU 14A.

Figure 6:
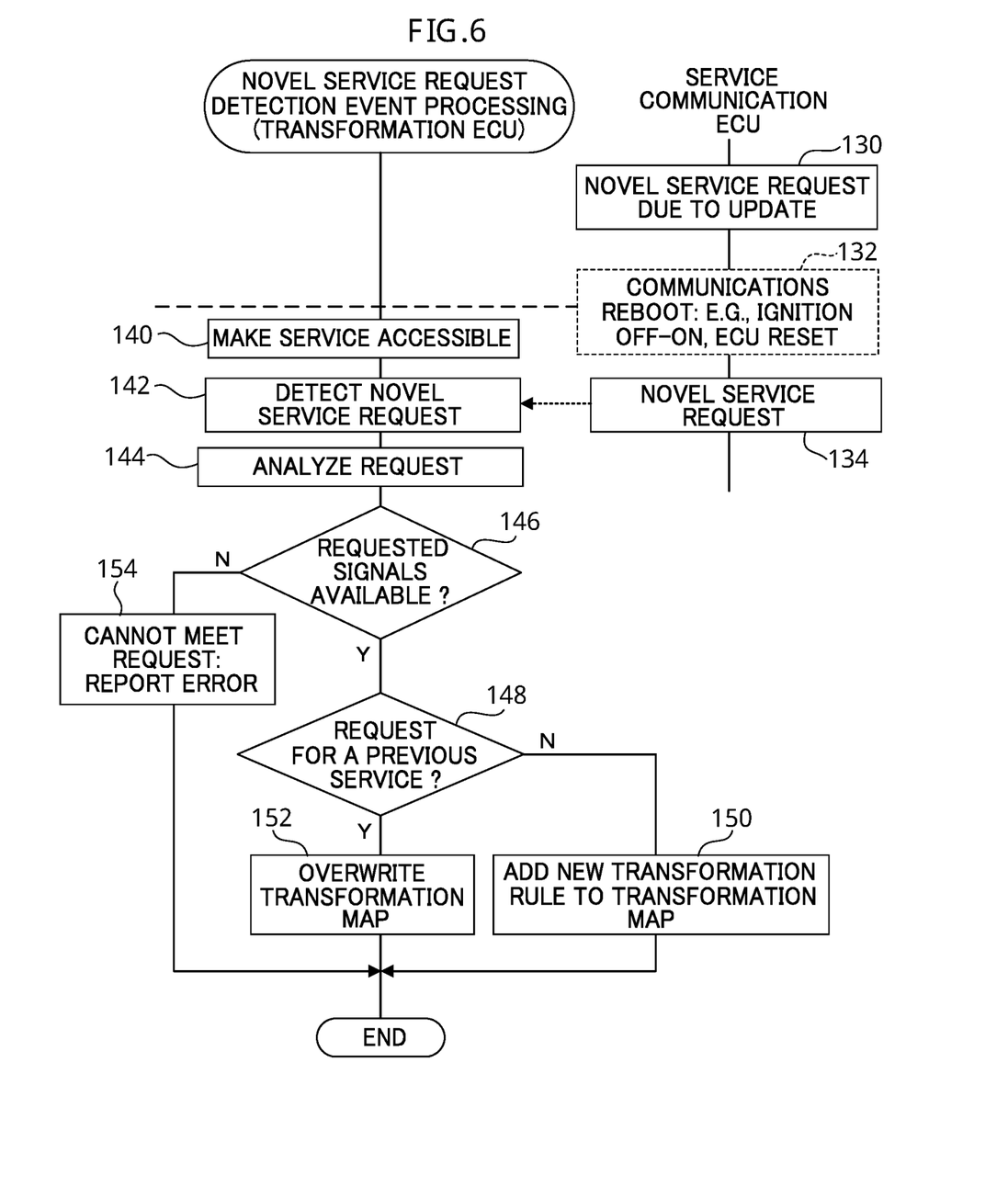
FIG. 6 is a flowchart illustrating novel service request detection event processing that is executed by the transformation ECU in a case in which a novel service request is detected.

Now, carrying out an update at the service communication ECUs 16 side is described with reference to FIG. 6.

In step 130, one of the service communication ECUs 16 carries out an update in accordance with a command from a user, and the service communication ECU 16 defines a novel service request according to the update. In step 132, the service communication ECU 16 is rebooted by, for example, the ignition switch being switched from off to on and the ECU reset being performed. In step 134, the service communication ECU 16 transmits a novel service request. This transmitted service request includes a description of details of a service request change that may be interpreted by the transformation ECU 20 at a payload of the communication data. Below, explanation continues for a case in which the service request change appears as a signal request from the service communication ECU 16.

Meanwhile, in step 140, after the transformation ECU 20 is rebooted by the ECU reset being performed, the transformation ECU 20 executes processing to make service information representing services that may be provided accessible over the on-board network 10. After the novel service request transmitted from the service communication ECU 16 is received, in step 142, the detection section 40 detects the novel service request.

In step 144, the control section 42 analyzes details of the service request change described in the payload of the novel service request detected by the detection section 40, and identifies signals requested by the service communication ECU 16. In step 146, the control section 42 makes a determination as to whether the signals requested by the service communication ECU 16 are actually available.

In a case in which the signals requested by the service communication ECU 16 are not available, the result of the determination in step 146 is negative and the control section 42 proceeds to step 154. In step 154, because the control section 42 cannot meet the request from the service communication ECU 16, the control section 42 reports an error to the service communication ECU 16 that is the transmission source of the service request.

Alternatively, in a case in which the signals requested by the service communication ECU 16 are actually available, the result of the determination in step 146 is affirmative and the control section 42 proceeds to step 148. In step 148, the control section 42 makes a determination as to whether the request from the service communication ECU 16 is a request for a previous service. In a case in which the result of the determination in step 148 is negative, the control section 42 proceeds to step 150. In step 150, the control section 42 adds a new transformation rule to the transformation map 32. On the other hand, in a case in which the result of the determination in step 148 is affirmative, the control section 42 proceeds to step 152. In step 152, the control section 42 overwrites the transformation map 32.

A specific example of carrying out an update at the service communication ECUs 16 side is described with reference to FIG. 7.

Figure 7:
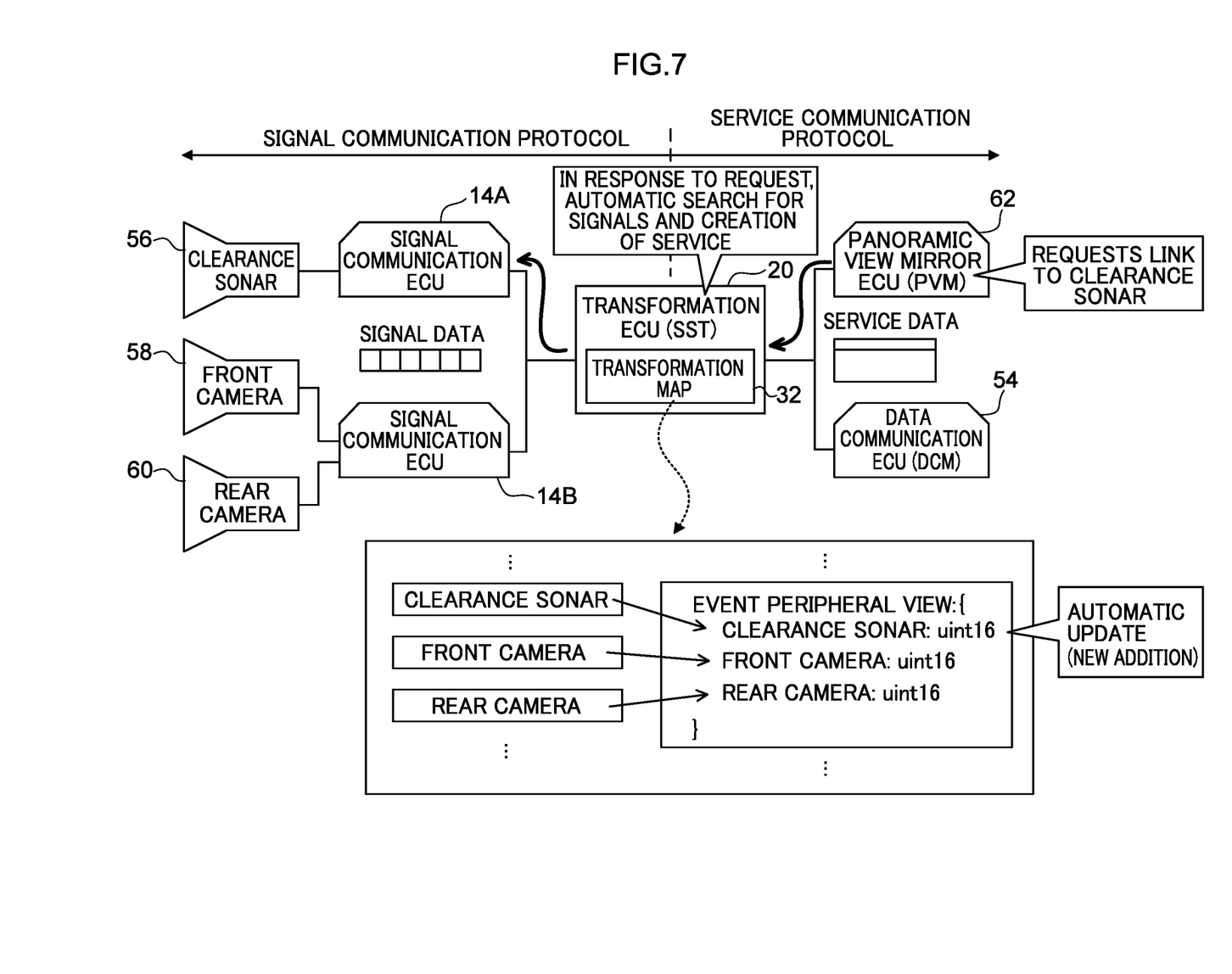
FIG. 7 is a schematic diagram for describing an example of operations in a case in which the novel service request detection event processing is executed.

In the example illustrated in FIG. 7, a clearance sonar 56, a front camera 58 and a rear camera 60 that serve as the sensors 12 are provided. The clearance sonar 56 is connected to the signal communication ECU 14A, and the front camera 58 and rear camera 60 are connected to the signal communication ECU 14B. A panoramic view monitor ECU (below refer to as the PVM ECU) 62 and the data communication ECU 54 that serve as the service communication ECUs 16 are also provided. Before an update is carried out at the PVM ECU 62, the transformation ECU 20 aggregates (transforms) captured images from the front camera 58 and captured images from the rear camera 60 that are received in the signal communication protocol to single sets of information that serves as peripheral view information, and transmits this information to the gauge ECU 52 in the service communication protocol.

In the example illustrated in FIG. 7, the PVM ECU 62 is updated so as to be able to display information from the clearance sonar 56 in a PVM. Conventionally, in association with this update, it would be necessary to separately update the SST manually.

In the exemplary embodiment, by contrast, the PVM ECU 62 acquires input information from a peripheral view service that the transformation ECU 20 makes accessible, and the PVM ECU 62 requests a service that appends information from the clearance sonar 56 to the previous peripheral view service. The transformation ECU 20 executes the novel service request detection event processing described above. Thus, in response to the service request change, the transformation ECU 20 automatically searches for signals containing information from the clearance sonar 56 and, as illustrated in FIG. 7, automatically adds a new line "clearance sonar: uint16" to the transformation map 32 (making this a service). Therefore, an update of the transformation ECU 20 is unnecessary. As a result of the transformation map 32 being updated, information from the clearance sonar 56 is added to the peripheral view information transmitted from the transformation ECU 20 to the PVM ECU 62. Therefore, a number of updates may be reduced to just one, the update of the PVM ECU 62.

Now, a further specific example of carrying out an update at the service communication ECUs 16 side is described with reference to FIG. 8.

Figure 8:
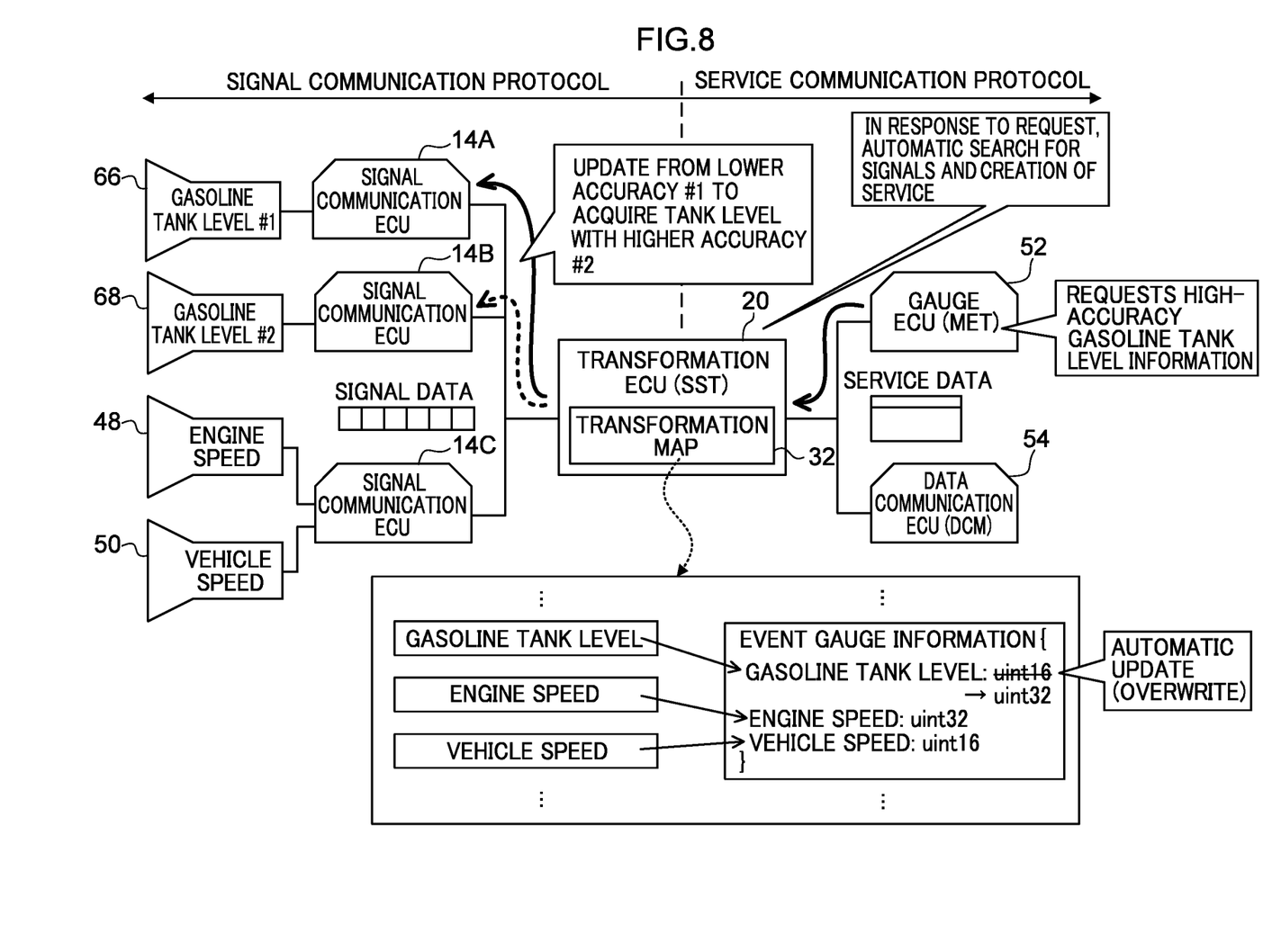
FIG. 8 is a schematic diagram for describing another example of operations in a case in which the novel service request detection event processing is executed.

In the example illustrated in FIG. 8, a gasoline tank level #1 sensor 66, a gasoline tank level #2 sensor 68, the engine speed sensor 48 and the vehicle speed sensor 50 that serve as the sensors 12 are provided. The gasoline tank level #2 sensor 68 is a sensor with higher accuracy (higher resolution) than the gasoline tank level #1 sensor 66. The gasoline tank level #1 sensor 66 is connected to the signal communication ECU 14A, the gasoline tank level #2 sensor 68 is connected to the signal communication ECU 14B, and the engine speed sensor 48 and vehicle speed sensor 50 are connected to a signal communication ECU 14C. The gauge ECU 52 and data communication ECU 54 that serve as the service communication ECUs 16 are provided. Before an update of the gauge ECU 52 is carried out, the transformation ECU 20 aggregates (transforms) respective data of gasoline tank levels detected by the gasoline tank level #1 sensor 66, engine speeds and vehicle speeds that are received in the signal communication protocol to single sets of gauge information, and transmits the gauge information to the gauge ECU 52 in the service communication protocol.

In the example illustrated in FIG. 8, the gauge ECU 52 is updated so as to be able to display a higher accuracy gasoline tank level at a gauge. Conventionally, in association with this update, it would be necessary to separately update the SST manually.

In the exemplary embodiment, by contrast, the gauge ECU 52 requests a service that appends high-accuracy gasoline tank level information. The transformation ECU 20 executes the novel service request detection event processing described above. Thus, in response to the service request change, the transformation ECU 20 automatically searches for signals containing high-accuracy gasoline tank level information and, as illustrated in FIG. 8, automatically overwrites the line "gasoline tank level: uint16" with the line "gasoline tank level: uint32" (making this a service). Therefore, an update of the transformation ECU 20 is unnecessary. As a result of the transformation map 32 being overwritten, the gasoline tank level information to be included in the gauge information transmitted from the transformation ECU 20 to the gauge ECU 52 is changed to the higher accuracy information detected by the gasoline tank level #2 sensor 68. Therefore, a number of updates may be reduced to just one, the update of the gauge ECU 52.

Thus, the transformation ECU 20 according to the exemplary embodiment is installed in the vehicle and includes: the transformation section 36 that transforms data transmitted from a first control device in a first communication protocol to data in a second communication protocol; the transmission section 38 that transmits the data transformed by the transformation section 36 to a second control device; the detection section 40 that detects an update of at least one of the first control device or the second control device; and the control section 42 that, in a case in which an update of at least one of the first control device or the second control device is detected by the detection section 40, changes a mode of the transformation by the transformation section 36. Therefore, once a control device is updated, manually updating the transformation from data in the first communication protocol to data in the second communication protocol may be made unnecessary.

In the exemplary embodiment, the transformation section 36 refers to the transformation map 32 for performing the transformation, the transformation map 32 defining data transformation rules, and the control section 42 changes a mode of transformation by the transformation section 36 by updating the transformation map 32. Therefore, changes of modes of transformation may be realized by simpler processing than in a situation in which a program that causes a device to function as the transformation section 36 is updated or the like.

In the exemplary embodiment, one of the first communication protocol and the second communication protocol is a signal communication protocol and the other is a service communication protocol. Therefore, because transformations are performed between data in the signal communication protocol and data in the service communication protocol, the signal communication protocol and the service communication protocol may be provided together.

In the exemplary embodiment, in a case in which novel signals from the signal communication ECUs 14 that perform signal communications are detected by the detection section 40, the control section 42 checks whether the novel signals are similar to previous signals. In a case in which the novel signals are similar to previous signals, the control section 42 checks that the novel signals are not erroneous signals, and subsequently checks that none of the previous signals are being propagated through the network. In a case in which none of the previous signals are being propagated through the network, the control section 42 confirms a user whether or not there has been an update of the signal communication ECUs 14. In a case in which there has been an update of the signal communication ECUs 14, the control section 42 changes a mode of transformation by the transformation section 36. Therefore, a case of the mode of transformation by the transformation section 36 being erroneously changed when abnormal data is erroneously detected as novel signals may be avoided.

In the exemplary embodiment, in a case in which a novel service request from the service communication ECUs 16 that perform service communications is detected by the detection section 40, the control section 42 analyzes the detected service request and checks whether signals requested by the detected service request are available. In a case in which these signals are available, the control section 42 changes a mode of transformation by the transformation section 36. Therefore, a case of the mode of transformation by the transformation section being erroneously changed when signals requested by a detected service request are not available may be avoided.

Above, descriptions are provided for separate situations in which an update is carried out at the signal communication ECUs 14 side and in which an update is carried out at the service communication ECUs 16 side, but this is not limiting. That is, the present disclosure is also applicable to a situation in which updates are carried out simultaneously at the signal communication ECUs 14 side and the service communication ECUs 16 side. Manually updating the transformation ECU 20 may be made unnecessary even in this situation.

Above, a mode is described in which one of the first communication protocol and the second communication protocol is a signal communication protocol and the other is a service communication protocol, but this is not limiting. It is sufficient that the first communication protocol and the second communication protocol are communication protocols that require transformation. The first communication protocol and second communication protocol are applicable to arbitrary communication protocols besides a signal communication protocol and a service communication protocol.

What is claimed is:

1. A transformation device installed in a vehicle, comprising:
   a memory; and
   a processor coupled to the memory, the processor configured to:
      transform data transmitted from a first control device in a first communication protocol to data in a second communication protocol using a transformation map;
      transmit the transformed data to a second control device;
      detect for a novel signal from the first control device and/or the second control device;
      in a case where the novel signal from the first control device and/or the second control device is detected, determine whether the novel signal matches a predetermined criteria;
      determine whether, after the novel signal is detected and during determination of whether the novel signal matches the predetermined criteria, none of previous signals is being propagated through a network;
      in a case where it is determined that the detected novel signal matches the predetermined criteria and none of the previous signals is being propagated through the network, confirm with a user whether the first control device and/or the second control device was updated;

in a case where it is determined that either or both of (a) the detected novel signal does not match the predetermined criteria and (b) at least one of the previous signals is being propagated through the network, the processor does not confirm with the user whether the first control device and/or the second control device was updated; and in a case where the user confirms that the first control device and/or the second control device was updated, change a content of the transformation map.

2. The transformation device according to claim 1, wherein the transformation map defines data transformation rules, and the processor is further configured to change the content of the transformation map by updating the transformation map.

3. The transformation device according to claim 1, wherein one of the first communication protocol or the second communication protocol is a signal communication protocol, and the other is a service communication protocol.

4. The transformation device according to claim 1, wherein the processor is further configured to:

in a case in which the novel signal is detected, check whether the novel signal is similar to the previous signals;

in a case in which the novel signal is similar to the previous signals, check that the novel signal matches the predetermined criteria; and subsequently, check that none of the previous signals is being propagated through the network.

5. The transformation device according to claim 1, wherein the processor is further configured to:

in a case in which a novel service request from a control device that performs service communications is detected, analyze the detected service request and check whether a signal requested by the detected service request is available; and in a case in which the signal is available, change the content of the transformation map.

6. An operation method of a transformation device installed in a vehicle, the operation method comprising:

transforming data transmitted from a first control device in a first communication protocol to data in a second communication protocol using a transformation map;

transmitting the transformed data to a second control device;

detecting for a novel signal from the first control device and/or the second control device;

in a case where the novel signal from the first control device and/or the second control device is detected, determining whether the novel signal matches a predetermined criteria;

determining whether, after the novel signal is detected and during determination of whether the novel signal matches the predetermined criteria, none of previous signals is being propagated through a network;

in a case where it is determined that the detected novel signal matches the predetermined criteria and none of the previous signals is being propagated through the network, confirming with a user whether the first control device and/or the second control device was updated;

in a case where it is determined that either or both of (a) the detected novel signal does not match the predetermined criteria and (b) at least one of the previous signals is being propagated through the network, not confirming with the user whether the first control device and/or the second control device was updated; and in a case where the user confirms that the first control device and/or the second control device was updated, changing a content of the transformation map.

7. A non-transitory computer readable storage medium storing a program that causes an on-vehicle computer to execute transformation processing, the transformation processing comprising:

transforming data transmitted from a first control device in a first communication protocol to data in a second communication protocol using a transformation map;

transmitting the transformed data to a second control device;

detecting for a novel signal from the first control device and/or the second control device;

in a case where the novel signal from the first control device and/or the second control device is detected, determining whether the novel signal matches a predetermined criteria;

determining whether, after the novel signal is detected and during determination of whether the novel signal matches the predetermined criteria, none of previous signals is being propagated through a network;

in a case where it is determined that the detected novel signal matches the predetermined criteria and none of the previous signals is being propagated through the network, confirming with a user whether the first control device and/or the second control device was updated;

in a case where it is determined that either or both of (a) the detected novel signal does not match the predetermined criteria and (b) at least one of the previous signals is being propagated through the network, not confirming with the user whether the first control device and/or the second control device was updated; and in a case where the user confirms that the first control device and/or the second control device was updated, changing a content of the transformation map.

8. The transformation device according to claim 1, wherein the signal contains an ID, and the processor is further configured to identify a signal having a same ID with the novel signal as one of the previous signals.

9. The transformation device according to claim 1, wherein the processor is configured to detect a signal that is not defined in the transformation map as the novel signal.

\* \* \* \* \*